April 14, 1970     C. H. COSTELLO     3,506,001

EYE-SPRAYING DEVICE HAVING MIRROR

Filed Nov. 4, 1966

INVENTOR
*Christopher H. Costello*

United States Patent Office 3,506,001
Patented Apr. 14, 1970

3,506,001
EYE-SPRAYING DEVICE HAVING MIRROR
Christopher Hollet Costello, Summit, N.J., assignor to Colgate-Palmolive Company, New York, N.Y., a corporation of Delaware
Filed Nov. 4, 1966, Ser. No. 592,025
Int. Cl. A61m *11/00*
U.S. Cl. 128—173           1 Claim

ABSTRACT OF THE DISCLOSURE

The device disclosed herein includes a container for medicated solutions to be administered to the eye, an outlet member associated with the upper portion of the container serving as a directional sprayer, and a mirror mounted and positioned on the device so that the image of the eye is reflected to the user of the device.

---

The present invention relates to administering medicated solutions to the eye and, more particularly, to spray devices for administering medicated solutions to the eye and provided with a mirror so placed on the spray device that the operator by seeing the reflected image of the operator's eye can direct a spray accurately into the eye which is reflected in the aforesaid mirror.

The conventional methods of administering medicated solutions to the eye are by the use of droppers and eye cups or baths. Since these come in direct contact with the eye, the opportunity for transfer of infection to the dropper or eye cup or to the medicated solution is considerable. The use of a fine spray by means of a nebulizer, squeeze bottle or aerosol devices has greatly reduced the risk of infection. However, considerable difficulty is experienced with these devices in accurately directing the medication into the eye.

The present invention provides for the attachment to the spray device of a small mirror so placed on the spray device that the operator by seeing the reflected image of the operator's eye to be treated can direct the spray accurately into the eye. The mirror also serves to focus light on to the eye. The mirror is postioned on the spray device so that the image of the eye to be treated is reflected and the spray of medicated solution is accurately directed simultaneously. By the use of the mirror on the spray device the spray can be directed into the eye before the reflex action called the wink, takes place.

Figure 1:
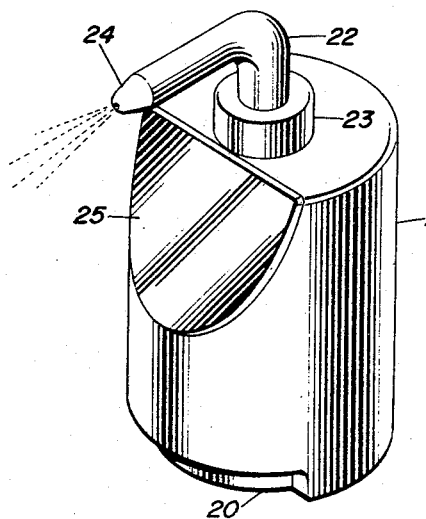
Figure 2:
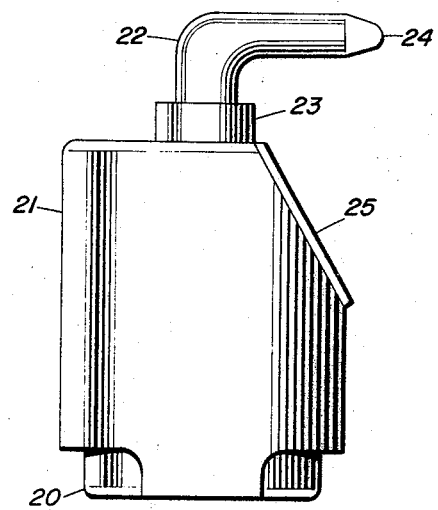

While the mirror can be mounted on the spray device in any position which with or without movement or adjustment thereof provides a reflection of the eye to be treated which is seen by the operator's eye, it is preferred to mount the mirror on part of the spray device, as will be manifest from the drawings in which:

FIGURE 1 is a perspective of a container having a button controlling the discharge of the contents of the container mounted in the bottom thereof and having a mirror mounted on the side of the container below the discharge outlet of the dispensing nozzle; and FIGURE 2 is a side view of the container illustrated in FIGURE 1.

A similar container 21 having a depressible button 20 in the bottom of container 21 is illustrated in FIGURES 1 and 2. As those skilled in the art know an aerosol cartridge containing the medicament is inserted in container 21 and the discharge thereof controlled by button 20. By pressure upwards on button 20 the contents of container 21 is discharged through tube 22 mounted in closure 23 and thence through nozzle 24. The container is fabricated from any suitable material, preferably relatively rigid plastic which is molded to provide at one side a plane surface having an angle of about 45 degrees downward with the surface of the top of the container. The mirror 25 is mounted on said plane surface and the closure 23, bearing the discharge tube 22 is mounted on the container with the nozzle in line with the vertical axis of the mirror 25.

What is claimed is:

1. A device for administering to an eye a burst of medicament-containing mist, said device comprising a substantially rigid container, a closure member mounted on the container, a discharge tube mounted in said closure, said discharge tube including a dispensing nozzle, and an aerosol means for propelling medicated solution through said discharge tube and out said dispensing nozzle, said container having an inclined plane surface centered on the vertical axis of the discharge tube and making an angle of about 45° downward from the top of the container and a mirror mounted on said inclined plane surface with said dispensing nozzle in line with the vertical axis of the mirror so that reflections of the eye and of the dispensing nozzle can be seen by the user of the device.

References Cited

UNITED STATES PATENTS

| | | | |
|---|---|---|---|
| 1,855,653 | 4/1932 | Strauss | 128—249 |
| 2,736,316 | 2/1956 | Stovall | 128—233 |
| 2,382,771 | 8/1945 | Bowers | 128—233 |
| 3,200,817 | 8/1965 | Brainard | 128—173 |
| 3,314,426 | 4/1967 | Carroll | 128—173 |

RICHARD A. GAUDET, Primary Examiner

J. D. YASKO, Assistant Examiner

U.S. Cl. X.R.

128—21; 222—106, 192